(12) United States Patent
Wu et al.

(10) Patent No.: US 7,945,110 B2
(45) Date of Patent: May 17, 2011

(54) METHODS AND APPARATUSES FOR ENHANCING IMAGE QUALITY

(75) Inventors: Yen-Hsing Wu, Hsin-Chu Hsien (TW); Chun-Hsing Hsieh, Hsin-Chu (TW); Chi-Feng Wang, Taipei Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1140 days.

(21) Appl. No.: 11/670,434

(22) Filed: Feb. 2, 2007

(65) Prior Publication Data
US 2007/0189631 A1    Aug. 16, 2007

(30) Foreign Application Priority Data
Feb. 15, 2006 (TW) ................. 95105093 A

(51) Int. Cl.
*G06K 9/40* (2006.01)
(52) U.S. Cl. ........................ 382/262; 382/261
(58) Field of Classification Search ........... 382/260–266
See application file for complete search history.

(56) References Cited

U.S. PATENT DOCUMENTS

| | | | |
|---|---|---|---|
| 4,334,244 A | 6/1982 | Chan et al. | |
| 4,935,806 A | 6/1990 | Rabii | |
| 5,119,179 A | 6/1992 | Hagino | |
| 5,311,306 A | 5/1994 | Tanaka | |
| 5,345,407 A | 9/1994 | Hostetler | |
| 5,426,470 A | 6/1995 | Kita | |
| 5,548,342 A | 8/1996 | Ikeda | |
| 5,920,357 A | 7/1999 | Ohara | |
| 6,380,973 B1 | 4/2002 | Kawahara | |
| 6,498,609 B1 | 12/2002 | De Haan | |
| 6,862,372 B2 * | 3/2005 | Yang et al. | 382/254 |
| 7,110,045 B2 | 9/2006 | Ishihara | |
| 7,224,406 B2 | 5/2007 | Lee | |
| 7,289,163 B2 | 10/2007 | Lin | |
| 7,382,915 B2 | 6/2008 | Bala | |
| 7,689,026 B2 * | 3/2010 | Fujii | 382/141 |
| 2002/0140854 A1 | 10/2002 | Lan | |
| 2004/0155983 A1 | 8/2004 | Topper | |

FOREIGN PATENT DOCUMENTS

| | | |
|---|---|---|
| JP | 63-260276 | 10/1988 |
| JP | 200318432 | 1/2003 |
| JP | 2004-166010 | 6/2004 |
| KR | 2001-0005282 | 1/2001 |

OTHER PUBLICATIONS

Al Bovik, "Handbook of Image & Video processing", p. 51-268., May 3, 1999.

* cited by examiner

*Primary Examiner* — Wesley Tucker
(74) *Attorney, Agent, or Firm* — Winston Hsu; Scott Margo

(57) ABSTRACT

A method for enhancing image quality includes: performing a peaking operation on an image signal to generate a peaking signal; selecting a plurality of pixels from the peaking signal and the image signal; and deciding a luminance value for a target pixel of the image signal according to luminance values of the plurality of pixels.

22 Claims, 4 Drawing Sheets

METHODS AND APPARATUSES FOR ENHANCING IMAGE QUALITY

BACKGROUND OF THE INVENTION

1. Field of the Invention

The present invention relates to image-processing techniques, and more particularly, to methods and apparatuses for enhancing image quality.

2. Description of the Prior Art

In conventional image-processing operations, a peaking operation is typically applied for enhancing the sharpness of the edges of the image to improve the visual quality of the image edges. However, the conventional peaking operation usually results in an undesirable overshoot/undershoot effect on the image edges thereby degrading the image quality.

SUMMARY OF THE INVENTION

It is therefore an objective of the claimed invention to provide methods and apparatuses to alleviate the overshoot/undershoot effect caused by the peaking operation.

An exemplary embodiment of an image quality enhancement apparatus is disclosed comprising: a peaking filter for performing a peaking operation on an image signal to generate a peaking signal; a selecting circuit coupled to the peaking filter for selecting a plurality of pixels from the peaking signal and the image signal; and a luminance setting circuit coupled to the selecting circuit for deciding a luminance value for a target pixel of the image signal in accordance with luminance values of the plurality of pixels.

An exemplary embodiment of a method for enhancing image quality is disclosed comprising: performing a peaking operation on an image signal to generate a peaking signal; selecting a plurality of pixels from the peaking signal and the image signal; and deciding a luminance value for a target pixel of the image signal in accordance with luminance values of the plurality of pixels.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
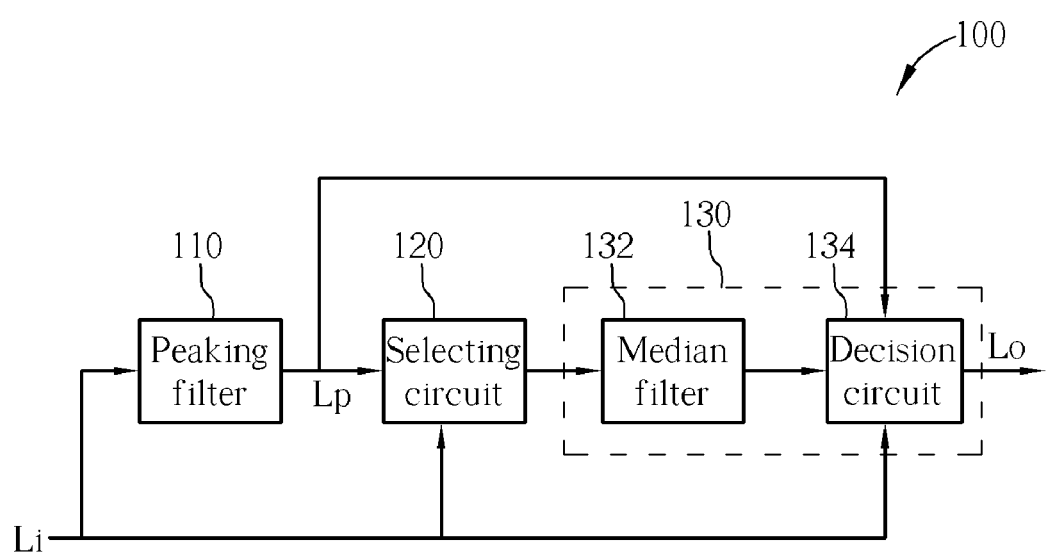
FIG. 1 is a simplified block diagram of an image quality enhancement apparatus according to an exemplary embodiment of the present invention.

Please refer to FIG. 1, which shows a simplified block diagram of an image quality enhancement apparatus 100 according to an exemplary embodiment of the present invention. As shown, the image quality enhancement apparatus 100 comprises a peaking filter 110, a selecting circuit 120, and a luminance setting circuit 130. In a preferred embodiment, the peaking filter 110 comprises (or implemented by) a high-pass filter, the selecting circuit 120 comprises a plurality of delay elements, and the luminance setting circuit 130 comprises a median filter 132 and a decision circuit 134. The image quality enhancement apparatus 100 adjusts the luminance value of each pixel in an incoming image signal Li to generate an output image signal Lo. In this embodiment, the image signal Li is a luminance signal such as the Y signal of a YUV format video signal.

Figure 2:
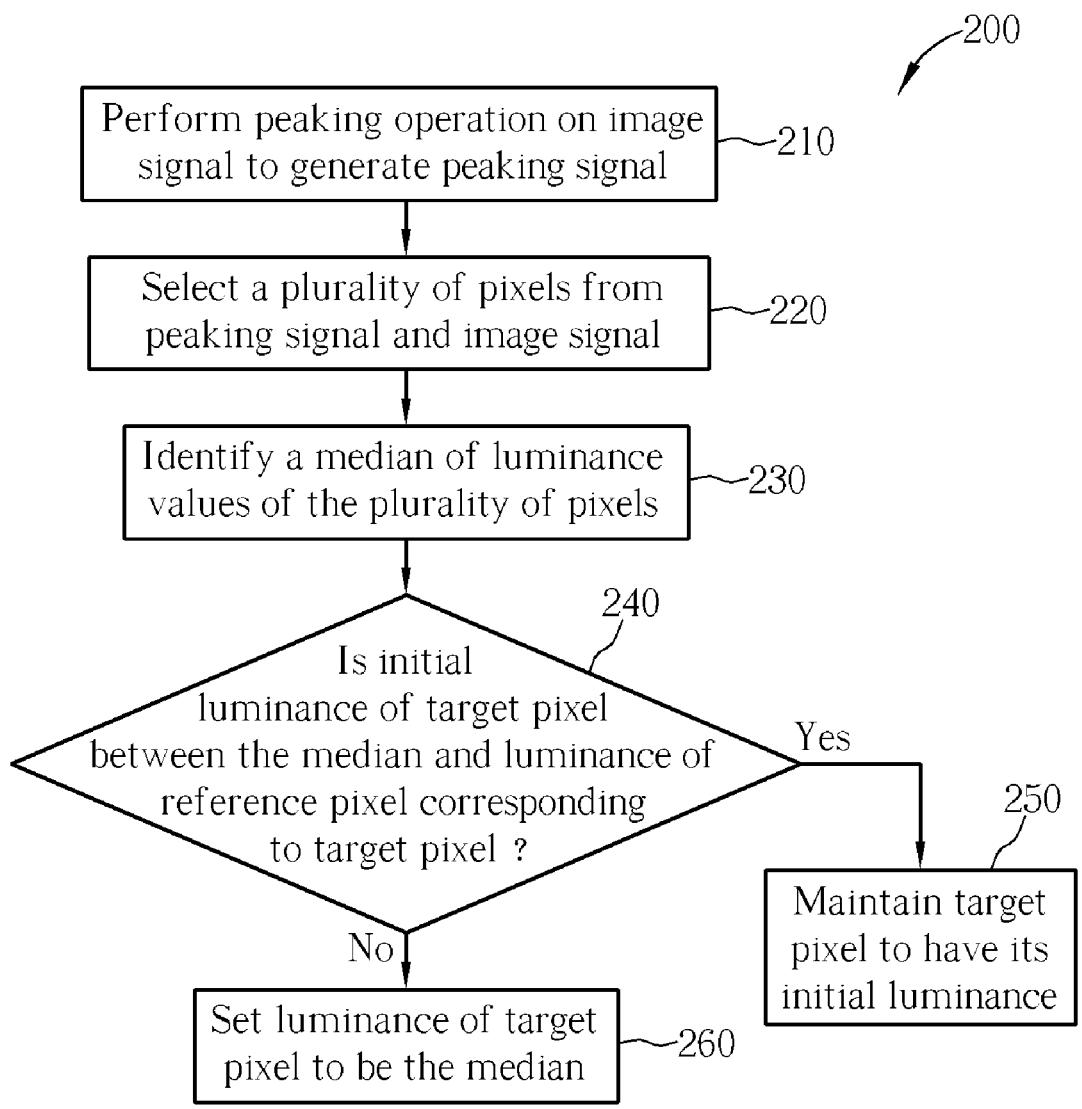
FIG. 2 is a flowchart illustrating a method for enhancing image quality according to an exemplary embodiment of the present invention.
Figure 3:
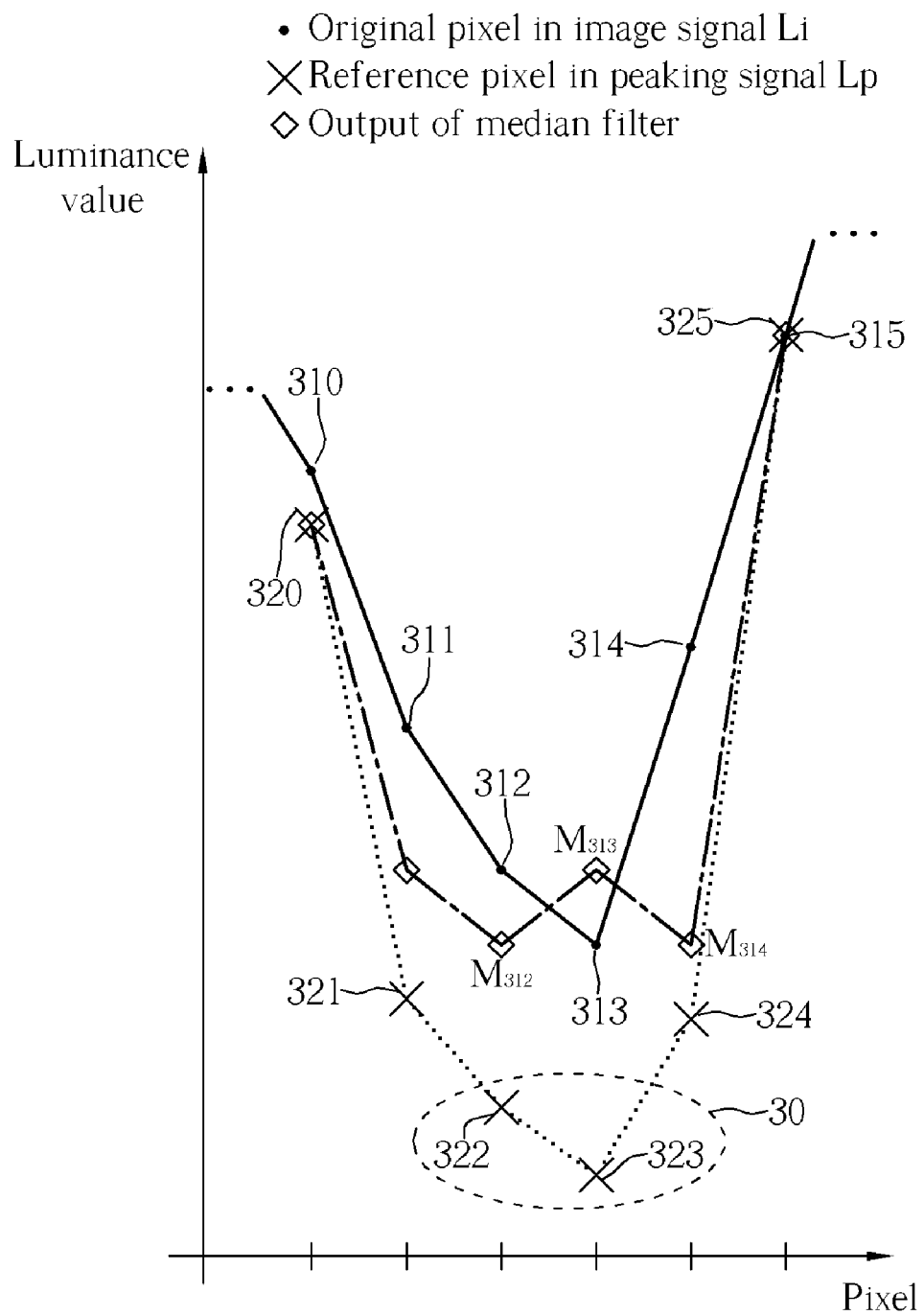
FIG. 3 is a simplified schematic diagram showing adjustment of the image signal according to a preferred embodiment of the present invention.

FIG. 2 depicts a flowchart 200 illustrating a method for enhancing image quality according to an exemplary embodiment of the present invention. FIG. 3 shows a simplified schematic diagram showing adjustment of the image signal Li according to a preferred embodiment of the present invention. In FIG. 3, pixels 310, 311, 312, 313, 314, and 315 labeled with the symbol "●" belong to the original pixels in the image signal Li. Hereinafter, the operations of the image quality enhancement apparatus 100 will be explained with reference to FIG. 2 and FIG. 3.

In step 210, the peaking filter 110 of the image quality enhancement apparatus 100 performs a peaking operation, such as a high-pass filtering operation, on the image signal Li to generate a peaking signal Lp. In the embodiment shown in FIG. 3, pixels 320, 321, 322, 323, 324, and 325 labeled with the symbol "×" are reference pixels in the peaking signal Lp, which respectively correspond to the original pixels 310, 311, 312, 313, 314, and 315. A dotted circle 30 in FIG. 3 represents a portion of the image edge that suffers the undershoot effect caused by the peaking operation.

In step 220, the selecting circuit 120 selects a plurality of pixels corresponding to a target pixel of the image signal Li to be processed from the peaking signal Lp and the image signal Li. In this embodiment, the selecting circuit 120 comprises a plurality of delay elements for respectively outputting the plurality of pixels. For the purpose of explanatory convenience in the following description, the pixel 312 of the image signal Li is herein assumed as the target pixel. In this embodiment, the selecting circuit 120 selects the reference pixels 312 corresponding to the target pixel 312 from the peaking signal Lp and two nearby pixels of the target pixel 312 from the image signal Li, for example, the two adjacent pixels 311 and 313 located at both sides of the target pixel 312 may be taken.

The median filter 132 then identifies a median $M_{312}$ of luminance values of the plurality of selected pixels in step 230. In this case, the median $M_{312}$ of the luminance value of the reference pixel 322 and the initial luminance values of the pixels 311 and 313 is the initial luminance value of the pixel 313. In FIG. 3, the symbol "◇" denotes the output of the median filter 132.

In step 240, the decision circuit 134 determines if an initial luminance value of the target pixel 312 is between the median $M_{312}$ (i.e., the initial luminance value of the pixel 313) and the luminance value of the reference pixel 322. If so, the decision circuit 134 then performs step 250, otherwise, it performs step 260.

In this embodiment, since both the median $M_{312}$ and the luminance value of the reference pixel 322 are less than the initial luminance value of the target pixel 312, the decision circuit 134 performs step 260 to set the luminance value of the target pixel 312 to be the median $M_{312}$. That is, the decision circuit 134 sets the luminance value of the target pixel 312 to be the same as the initial luminance value of the pixel 313.

Regarding another case where the target pixel is the pixel 313 of the image signal Li, the selecting circuit 120 selects the reference pixel 323 corresponding to the target pixel 313 from the peaking signal Lp and two nearby pixels 312 and 314 of the target pixel 313 from the image signal Li in step 220.

Then, the median filter 132 identifies a median $M_{313}$ of the luminance value of the reference pixel 323 and the initial luminance values of the pixels 312 and 314 in step 230. In this case, the median $M_{313}$ output from the median filter 132 is the initial luminance value of the pixel 312. The decision circuit 134 then performs step 240 to determine if an initial luminance value of the target pixel 313 is between the median $M_{313}$ (i.e., the initial luminance value of the pixel 312) and the luminance value of the reference pixel 323. As shown in FIG. 3, since the initial luminance value of the target pixel 313 is between the median $M_{313}$ and the luminance value of the reference pixel 323, the decision circuit 134 the performs step 250 to maintain the target pixel 313 to have its initial luminance value.

As described in the foregoing embodiments, when both the median filter 132 and the peaking filter 110 tend to adjust the luminance of the target pixel toward the same direction (i.e., the initial luminance value of the target pixel is not between the luminance value of the corresponding reference pixel and the corresponding median output from the median filter 132), the decision circuit 134 adjusts the luminance of the target pixel to be the median. Otherwise, the decision circuit 134 maintains the target pixel to have its initial luminance value. As a result, the undershoot effect shown by the dotted circle 30 can be effectively suppressed or alleviated. Similarly, the method disclosed previously can also be applied to alleviate the overshoot effect on image edges caused by the peaking operation.

Please note that the two nearby pixels of the target pixels selected from the image signal Li by the selecting circuit 120 may be two pixels nearby the target pixel with a predetermined distance, such as several pixels, however, the present invention is not limited to two adjacent pixels of the target pixel as this is provided as an example only. In practice, the luminance setting circuit 130 may simply set the luminance value of the target pixel to be the median output from the median filter 132.

Figure 4:
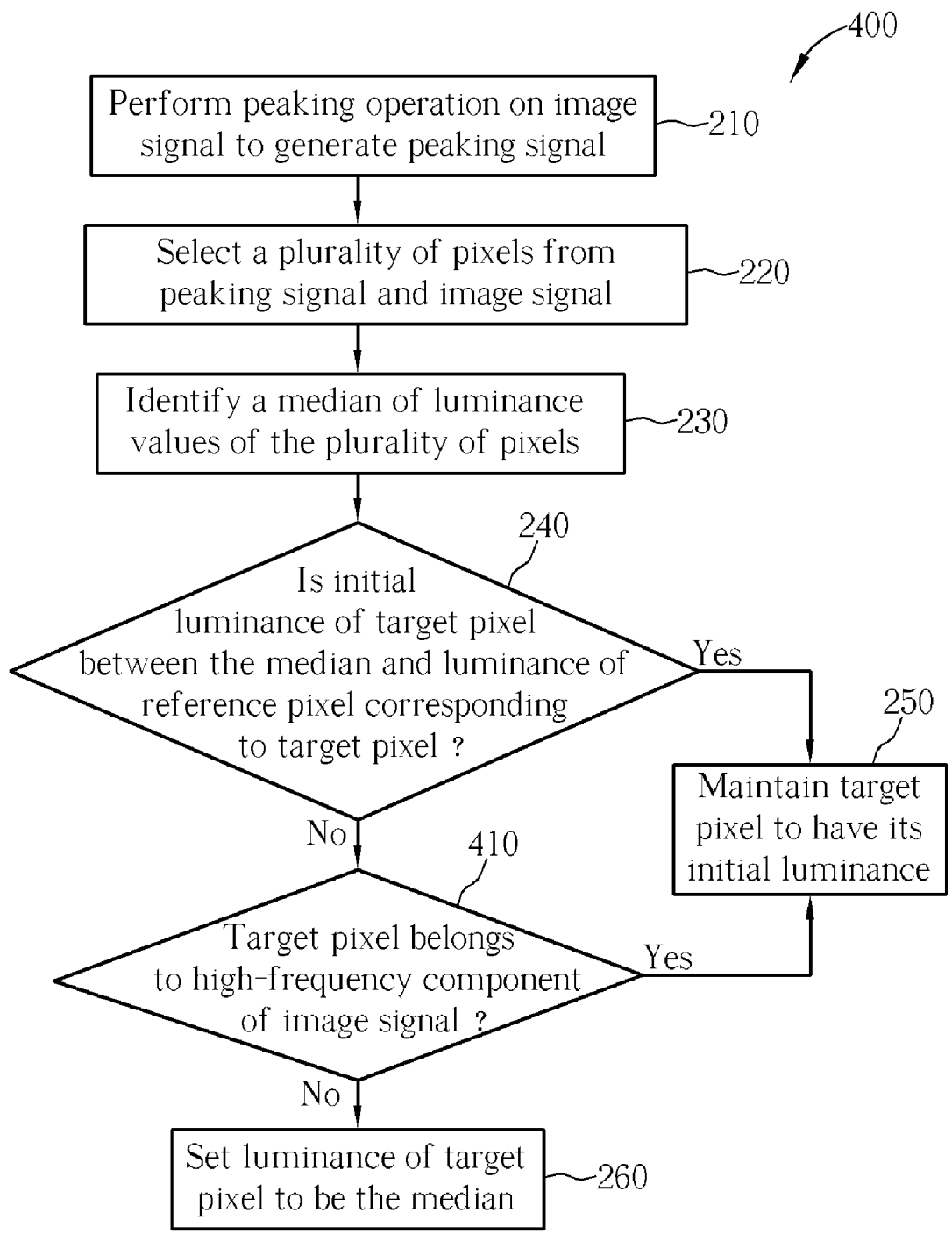
FIG. 4 is a flowchart illustrating a method for enhancing image quality according to another embodiment of the present invention.

Please refer to FIG. 4, which shows a flowchart 400 illustrating a method for enhancing image quality according to another embodiment of the present invention. The steps of the flowchart 400 are similar to the steps of the foregoing flowchart 200, and steps labeled the same have substantially the same operation. For the sake of brevity, repeated descriptions are therefore omitted herein. A difference between the flowcharts 400 and 200 is the addition of step 410 to flowchart 400.

In this embodiment, when the judgment made by the decision circuit 134 in step 240 is negative, the decision circuit 134 then performs step 410 to determine if the target pixel belongs to high-frequency component of the image signal Li. For the purpose of explanatory convenience in the following description, the pixel 314 of the image signal Li is herein assumed as the target pixel. In practice, the decision circuit 134 may calculate an absolute difference between initial luminance values of the preceding pixel 313 and the succeeding pixel 315 of the target pixel 314 and then compare the absolute difference with a predetermined threshold to determine if the target pixel 314 belongs to high-frequency component of the image signal Li. In this case, if the absolute difference is greater than the predetermined threshold, the decision circuit 134 determines that the target pixel 314 belongs to the high-frequency component of the image signal Li; otherwise, the target pixel 314 is deemed as not belonging to the high-frequency component of the image signal Li. In practical implementations, the approach employed for determining if the target pixel belongs to the high-frequency component of the image signal Li is not restricted to the described embodiment. Those skilled in the art can also apply other determining methods to achieve the same purpose.

In this embodiment, if the target pixel 314 is deemed as not belonging to the high-frequency component of the image signal Li, the decision circuit 134 performs step 260 to set the luminance value of the target pixel 314 to be a corresponding median $M_{314}$ output from the median filter 132. In this case, the median $M_{314}$ is equal to the initial luminance value of the pixel 313.

On the contrary, if the target pixel 314 is deemed as the high-frequency component of the image signal Li, the decision circuit 134 performs step 250 to maintain the target pixel 314 to have its initial luminance value rather than to set the luminance value of the target pixel 314 to be the median $M_{314}$. Such a scheme is capable of preventing an image region having severe luminance from becoming discontinuous due to changes from suffering severer luminance adjustment.

In the embodiment shown in FIG. 4, as described hereinbefore, the decision circuit 134 sets the luminance value of the target pixel to be the corresponding median only when the judgments made in steps 240 and 410 are both negative. Otherwise, the decision circuit 134 simply utilizes the initial luminance value of the target pixel as the final luminance setting of the target pixel.

In addition, the executing order of the steps in the flowchart 400 is merely an example rather than a restriction of the practical implementations. For example, step 410 can be performed before or at the same time with step 240. Moreover, the decision circuit 134 may simply perform one of the two steps 240 and 410 to decide the luminance value for the target pixel.

As can be derived from the above descriptions, the methods and related apparatuses disclosed hereinbefore not only improve the sharpness of image edges but also effectively alleviate the overshoot/undershoot effect on the image edges. Therefore, the visual quality of the output image can be significantly upgraded.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image quality enhancement apparatus comprising:
   a peaking filter for performing a peaking operation on an image signal to generate a peaking signal;
   a selecting circuit coupled to the peaking filter for selecting a plurality of pixels from the peaking signal and the image signal; and
   a luminance setting circuit coupled to the selecting circuit for deciding a luminance value for a target pixel of the image signal in accordance with luminance values of the plurality of pixels, wherein the luminance setting circuit comprises:
      a median filter for identifying a median of luminance values of the plurality of pixels; and
      a decision circuit coupled to the median filter for determining whether an initial luminance value of the target pixel is between the median and a luminance value of a reference pixel, which corresponds to the target pixel, from the peaking signal;
   wherein if the initial luminance value is not between the median and the luminance value of the reference pixel, the decision circuit sets the luminance of the target pixel to be the median.

2. The image quality enhancement apparatus of claim 1, wherein the plurality of pixels comprises two nearby pixels from the image signal and a reference pixel from the peaking signal, in which the two nearby pixels are near the target pixel and the reference pixel corresponds to the target pixel.

3. The image quality enhancement apparatus of claim 2, wherein the two nearby pixels are located on opposite sides of the target pixel.

4. The image quality enhancement apparatus of claim 3, wherein there is a predetermined distance between each of the two nearby pixels and the target pixel.

5. The image quality enhancement apparatus of claim 1, wherein if the initial luminance value is between the median and the luminance value of the reference pixel, the decision circuit maintains the initial luminance value of the target pixel.

6. The image quality enhancement apparatus of claim 1, wherein
if the target pixel is deemed as not belonging to the high-frequency component of the image signal, the decision circuit sets the luminance of the target pixel to be the median.

7. The image quality enhancement apparatus of claim 1, wherein
if the initial luminance value is not between the median and the luminance value of the reference pixel, and the target pixel is deemed as not belonging to the high-frequency component of the image signal, the decision circuit sets the luminance of the target pixel to be the median.

8. The image quality enhancement apparatus of claim 1, wherein the peaking filter comprises a high-pass filter.

9. A method for enhancing image quality comprising:
performing a peaking operation on an image signal to generate a peaking signal;
selecting a plurality of pixels from the peaking signal and the image signal; and
utilizing a luminance setting circuit to decide a luminance value for a target pixel of the image signal according to luminance values of the plurality of pixels, comprising:
identifying a median of luminance values of the plurality of pixels;
determining if an initial luminance value of the target pixel is between the median and a luminance value of a reference pixel, which corresponds to the target pixel, from the peaking signal; and
if the initial luminance value is not between the median and the luminance value of the reference pixel, setting the luminance of the target pixel to be the median.

10. The method of claim 9, wherein the plurality of pixels comprises two nearby pixels from the image signal and a reference pixel from the peaking signal, in which the two nearby pixels are near the target pixel and the reference pixel corresponds to the target pixel.

11. The method of claim 10, wherein the two nearby pixels are located on opposite sides of the target pixel.

12. The method of claim 11, wherein there is a predetermined distance between each of the two nearby pixels and the target pixel.

13. The method of claim 9, further comprising:
if the initial luminance value is between the median and the luminance value of the reference pixel, maintaining the initial luminance value of the target pixel.

14. The method of claim 9, wherein the step of utilizing the luminance setting circuit to decide the luminance value for the target pixel comprises:
determining if the target pixel belongs to high-frequency component of the image signal; and
if the target pixel is deemed as not belonging to the high-frequency component of the image signal, setting the luminance of the target pixel to be the median.

15. The method of claim 9, wherein the step of utilizing the luminance setting circuit to decide the luminance value for the target pixel comprises:
determining if the target pixel belongs to a high-frequency component of the image signal; and
if the initial luminance value is not between the median and the luminance value of the reference pixel, and the target pixel is deemed as not belonging to the high-frequency component of the image signal, setting the luminance of the target pixel to be the median.

16. The method of claim 9, wherein the peaking operation is a high-pass operation.

17. An image quality enhancement apparatus comprising:
a peaking filter for performing a peaking operation on an image signal to generate a peaking signal;
a selecting circuit coupled to the peaking filter for selecting a plurality of pixels from the peaking signal and the image signal; and
a luminance setting circuit coupled to the selecting circuit for deciding a luminance value for a target pixel of the image signal in accordance with luminance values of the plurality of pixels, wherein the luminance setting circuit comprises:
a median filter for identifying a median of luminance values of the plurality of pixels; and
a decision circuit coupled to the median filter for determining whether the target pixel belongs to high-frequency component of the image signal;
wherein if the target pixel is deemed as not belonging to the high-frequency component of the image signal, the decision circuit sets the luminance of the target pixel to be the median.

18. A method for enhancing image quality comprising:
performing a peaking operation on an image signal to generate a peaking signal;
selecting a plurality of pixels from the peaking signal and the image signal; and
utilizing a luminance setting circuit to decide a luminance value for a target pixel of the image signal according to luminance values of the plurality of pixels, comprising:
identifying a median of luminance values of the plurality of pixels;
determining whether the target pixel belongs to high-frequency component of the image signal; and
if the target pixel is deemed as not belonging to the high-frequency component of the image signal, setting the luminance of the target pixel to be the median.

19. An image quality enhancement apparatus comprising:
a peaking filter for performing a peaking operation on an image signal to generate a peaking signal;
a selecting circuit coupled to the peaking filter for selecting a plurality of pixels corresponding to a target pixel; and
a luminance setting circuit coupled to the selecting circuit for deciding a luminance value for a target pixel of the image signal according to luminance values of the plurality of pixels, wherein the plurality of pixels include a reference pixel, which corresponds to the target pixel, from the peaking signal and at least two adjacent pixels located at both sides of the target pixel, and the luminance setting circuit comprises:
a median filter for identifying a median of luminance values of the plurality of pixels; and a decision circuit coupled to the median filter for determining the luminance value for the target pixel in accordance with the plurality of pixels.

20. The image quality enhancement apparatus of claim 19, wherein if an initial luminance value of the target value is not between the median and the luminance value of the reference pixel, the decision circuit sets the luminance of the target pixel to be the median.

21. The image quality enhancement apparatus of claim 20, wherein if the initial luminance value is between the median and the luminance value of the reference pixel, the decision circuit maintains the initial luminance value of the target pixel.

22. The image quality enhancement apparatus of claim 19, wherein if the target pixel is deemed as not belonging to the high-frequency component of the image signal, the decision circuit sets the luminance of the target pixel to be the median.

* * * * *